US 6,561,131 B1

(12) United States Patent
Schwartz (10) Patent No.: US 6,561,131 B1
(45) Date of Patent: May 13, 2003

(54) PET TOILET AND METHOD OF CLEANING SAME (76) Inventor: Steven Schwartz, 222 Linn St., Ithaca, NY (US) 14850

(*) Notice: Subject to any disclaimer, the term of this patent is extended or adjusted under 35 U.S.C. 154(b) by 0 days.

(21) Appl. No.: 10/068,393
(22) Filed: Feb. 5, 2002
(51) Int. Cl.[7] .............................................. A01K 29/00
(52) U.S. Cl. .................. 119/166; 119/163; 119/161
(58) Field of Search ........................... 119/166, 161, 119/163, 164, 165, 168, 170

(56) References Cited

U.S. PATENT DOCUMENTS

| | | | | |
|---|---|---|---|---|
| 3,965,863 A | * | 6/1976 | Scott | 119/161 |
| 4,242,763 A | * | 1/1981 | Walker | 119/164 |
| 4,432,498 A | * | 2/1984 | Clements | 119/165 |
| 4,527,511 A | * | 7/1985 | Richards | 119/161 |
| 4,593,645 A | | 6/1986 | Dingler | 119/1 |
| 4,854,267 A | | 8/1989 | Morrow | 119/1 |
| 5,048,463 A | * | 9/1991 | Wilson et al. | 119/163 |
| 5,048,465 A | * | 9/1991 | Carlisi | 119/166 |
| 5,289,799 A | * | 3/1994 | Wilson | 119/164 |
| 5,509,379 A | * | 4/1996 | Hoeschen | 119/166 |
| 5,592,900 A | * | 1/1997 | Kakuta | 119/164 |
| 5,791,288 A | | 8/1998 | Ehrler | 119/163 |
| 5,911,194 A | * | 6/1999 | Pierson, Jr. | 119/166 |
| 6,041,737 A | * | 3/2000 | Hennigan | 119/165 |
| 6,079,364 A | * | 6/2000 | Tamba | 119/163 |
| 6,138,609 A | * | 10/2000 | Gordon | 119/166 |
| 6,263,834 B1 | * | 7/2001 | Igual De Valles | 119/166 |
| 6,401,660 B1 | * | 6/2002 | Wolff | 119/165 |
| 6,453,844 B1 | * | 9/2002 | Janzen et al. | 119/163 |

FOREIGN PATENT DOCUMENTS

DE        3943363 A1 * 6/1990 ................. 119/161

OTHER PUBLICATIONS

"LitterMaid™™ Self Cleaning Litter Box." http://www.litterMaid.com, Applica Consumer Products, 2000–2002.
LitterMaid™ Self Cleaning Litter Box Installation and Operation Manual. Applica Consumer Products, 2000–2002.

* cited by examiner

Primary Examiner—Peter M. Poon
Assistant Examiner—Joan M. Olszewski
(74) Attorney, Agent, or Firm—Brown & Michaels, PC (57) ABSTRACT A pet toilet preferably includes a litter chamber with a sculptured end and a tapered end. A mechanism preferably moves the litter chamber to a vertical position to meet a stationary vertical lid for cleaning. When the lid and the litter chamber are together, an airtight seal is created. The sculptured end is at the top of the litter chamber and the tapered end is at the bottom of the litter chamber when the litter chamber is in a vertical position. A blade, found at the lowest point of the tapered end, cuts and agitates the waste collected by gravity at this lowest point. Water, added to the vertical litter chamber through an inlet and holes around the blade, floats the waste to the top of the litter chamber. The sculptured end catches floating waste and directs it out of the pet toilet through an exit pipe.

18 Claims, 9 Drawing Sheets

PET TOILET AND METHOD OF CLEANING SAME

BACKGROUND OF THE INVENTION

1. Field of the Invention

The invention relates to a pet toilet for collecting and disposing of animal waste products. More particularly, the invention relates to a pet toilet for dealing with pet waste after the pet has used a litter chamber.

2. Description of Related Art

Given the natural behavior of house cats when it comes to their elimination habits, cat owners have continuously sought a device which cats would use which would at the same time require little cleaning, be of low cost, and be environmentally sound. The prior art solutions began with plain tubs holding shredded newspaper, sand or sawdust. This created a soggy mess which needed to be emptied often. Although they were low cost and relatively easy to clean, these devices presented odor and sanitation problems for both the cat and its owner. From that low-tech beginning, the art has gone through several major evolutions.

First, there were generations of litters. Aromatic saw dust, wood chips such as cedar or pine, and pelletized paper with scent added all have been marketed throughout the years. These litters turn out not to be much different than what one could make at home on their own. The chief action of these litters is to absorb liquid, and, to an insignificant degree, odor.

Pelletized clay litters came next. These litters afforded somewhat better liquid and odor absorption, allowing them to be used for a slightly longer time period before the entire contents of the litter needed to be changed. Due to the longer time period between changing the litter, however, the odor actually was worse due to the rapid conversion of cat urine into ammonia.

A major advancement came with the advent of litters which "clump" in the presence of urine due to the addition of bismuth or other materials in the litter. These litters had the advantage of containing an animal's liquid waste in a compact package for its selective removal from the bulk of the uncontaminated litter. One merely has to rake out the litter box periodically with the use of a small slotted shovel, removing waste and the source of odor. Disadvantages with these types of litters include cost and the fact that these litters are heavy to transport. These type of litters represent only a small gain in time until they are fouled to the point of needing to replace the entire pan. Most significantly, after disposable diapers, these types of litters are the second most damaging pollutants affecting landfills today. Despite these negatives, these clumping litters have gained wide acceptance due to their odor control abilities.

This has fostered the design of several systems of automatic and semiautomatic screening types of litter box systems which afford an attention-free screening out of waste, both urine and solid. While this represents an apparent advantage to the user by saving the time consumed by scooping, the advantage is actually minor. Nothing is gained in terms of cost of the litter, carrying the litter, or the amount of litter ending up in landfills. It seems clear as well that any time saved in not having to manually screen the box is offset when it comes to periodic cleaning of the entire device. This is no doubt necessary and difficult given the need to completely empty the device and clean it using solvents, water and brushes.

Most recently, litter boxes have been designed which use some type of permanent litter, employing mechanical action, or mechanical action and water, to clean the litter after it has been soiled. One such mechanical device is described in U.S. Pat. No. 4,854,267. This device places non-absorbent granular litter on a screen which is over a container meant to contain the liquid waste after it drains through the granular litter. Solid waste remains in the granular litter for the cat to bury. When the cat owner desires to clean this device, a hand-operated lever activates a system of levers, which flip the litter container into a vertical position. This action sifts out the solid waste, projecting it into a container, and propels the collected liquid waste into the same container for disposal. The drawbacks of the device are extreme. The propensity for odor generation is greatly enhanced due to the fact that the liquid waste has no contact with any absorptive material, as well as it coming into contact with the solid waste, giving it a further opportunity to disperse. Since there is no provision for cleaning the granular litter incorporated into the device, regular maintenance of the device is impractical.

Another device is disclosed in U.S. Pat. No. 4,593,645. This device utilizes a non-absorbent granular litter, placing it in a two-chambered tub separated by a flap valve. When the time arrives for cleaning out the accumulated liquid and solid waste, no automatic action is employed. The owner uses a spray hose to agitate the litter and break the solid waste free from the litter. At the same time, the litter holding tub is filled with water, thereby floating the solid waste. After accomplishing this, the operator then opens a flap valve of a design to allow the accumulated water, liquid and floating solid waste to be carried out into the second chamber quickly, to carry out all the floating solid waste. While this design is simple enough to be inexpensive, the litter is not cleaned effectively enough to assure no odor build up. It is also apparent that the litter remains quite wet, a strong deterrent to a cat's continued use.

Another cat box employing mechanical action and a water bath to float solid waste off of a nonporous litter is described in U.S. Pat. No. 5,791,288. In this device, a special litter is manufactured which is the only litter that can be used with the device. This litter is composed of soft iron pellets with a plastic hull or hollow iron pellets. The desired effect of using these pellets is that they will float in water. Since they are a magnetic material, however, they will respond to electromagnetic force by being pulled downward when in a water bath. These electromagnets are movable as well. The operation of this box is such that, when cleaning is desired, water fills the tub containing these pellets. The electromagnets are put into motion so as to break up solid waste as well as free the solid waste from its attachment to any of the pellets. After a predetermined time for this cycle, more water is added to the tub. This creates a condition whereby solid waste is floated up to a drain-off tube where the waste particles can be drained off with water. The effectiveness of this portion of the device's operation is enhanced by the ability of the electromagnets to pull the pellets down and alternately to free them to rise in the water. By repeating this action, it is expected that complete cleaning of the pellets and the box will be accomplished. After draining off the remainder of the water, the electromagnets can be further activated to agitate the pellets to quicken their drying.

While the simplicity of design of the '288 litter box leads to low cost construction and assured reliability, it seems that there will be high costs involved with several aspects of its manufacture and its continued use. The pellets, being of special design, will be costly as well as difficult to manufacture. Their weight to buoyancy ratio, as well as their degree of response to the applied electromagnetic force needs to be precise. The method of cleaning requires a large amount of water for proper operation. A large amount of copper is needed to develop the required electromagnetic force. A large amount of electrical power is consumed during use.

The Litter Maids® self-cleaning cat litter box, manufactured by Applica Consumer Products, Inc, of Miami Lakes, Fla., uses conventional clumping cat litter. When a photocell arrangement detects the presence of a cat in the litter box, a timer is started, and ten minutes later a rake travels the length of the box, raking the clumped litter into a storage container. This product is only a small improvement over the conventional litter box, with all of the disadvantages of clumping litter alleviated slightly by having the raking done automatically.

Therefore, there is a need in the art for an apparatus for the disposal of animal wastes, which solves the various problems described above.

SUMMARY OF THE INVENTION

The invention is a pet toilet which utilizes non-absorbent particulate material as litter and cleans the litter with water. The pet toilet preferably includes a litter chamber with a sculptured end and a tapered end. When the litter chamber is uncovered and in a horizontal position, it is available for a pet's use. A stationary vertical lid fits onto the litter chamber. In a preferred embodiment, a mechanism moves the litter chamber to a vertical position to meet the lid for cleaning. The mechanism is able to move the litter chamber back and forth between a vertical and horizontal position. When the lid and the litter chamber are together, an airtight seal is created so that neither water nor waste leaks from the chamber. The sculptured end is at the top of the litter chamber and the tapered end is at the bottom of the litter chamber when the litter chamber is in a vertical position. A blade is found at the lowest point of the tapered end. Gravity collects all of the waste at this lowest point, so the blade is able to cut and agitate the waste. Water is added to the vertical litter chamber through an inlet and holes around the blade. Sufficient water is added to float the waste to the top of the litter chamber. The sculptured end catches floating waste and directs it out of the pet toilet through an exit pipe. Dirty water is also removed from the chamber through additional plumbing.

DETAILED DESCRIPTION OF THE INVENTION

This invention discloses a pet toilet and a method of disposing of pet waste. The device is preferably used as a cat litter box, and the examples presented below are described for using the device for removing feline wastes. However, any other animal that can be trained to use a litter box can use the device of the invention. The invention consumes very little water by applying water in limited quantities. The device attains a high degree of cleanliness through its normal cleaning cycles.

Preferably, the pet owner manually starts the cleaning cycle by pressing a flush button, which activates the cleaning cycle by moving the litter chamber into a vertical position to meet the lid. Alternatively, the pet owner places the toilet on a timer so that cleaning occurs in specified intervals. Even when using a timer, the presence of a pet, such as a cat, in the toilet, physically keeps the litter chamber from closing at the prescribed time, thereby protecting the animal from harm. The user has multiple options for how the unit connects to the drainage system during installation, allowing it to fit into most situations.

The objects of the present invention and the attendant advantages will become apparent from the following description thereof.

Referring to FIGS. 1 through 5, a pet toilet (1) has a litter chamber (2). The litter chamber (2) has a sculptured end (23) and a tapered end (16). When the pet toilet (1) is closed, a stationary, vertical lid (32) fits into the litter chamber (2). The lid (32) also has a matching sculptured end (24) which, when mated with the sculptured end (23) of the litter chamber (2), creates an airtight seal. Non-absorbent particulate material may be placed in the litter chamber (2). This "litter" (33) is preferably made of coarse sand, or plastic, glass or elastic beads.

The litter chamber (2) lies on a stand (22) on the base (4) of an L-shaped support (3). The stand (22) is needed to keep the litter chamber (2) level when it is not being cleaned. Two extensions (5) are perpendicularly attached to one end of the base (4). The extensions (5) run along the lid (32), and work with a mechanism to provide movement for the litter chamber (2). This mechanism includes a transmission (9) and a motor (15) which drive a transaxle (6) attached to a pair of gears (7) on each end of the transaxle (6). The transaxle (6) is preferably mounted on the extensions (5). Each pair of gears (7) is connected by chains (8). The whole mechanism allows the litter chamber (2) to move from a vertical to a horizontal position (or vice versa), as needed.

A programmable logic controller (PLC) (36) controls all of the different cleaning steps in the pet toilet by using timing functions. For example, water levels, agitation time, draining time as a function of fill time are all preferably controlled by the PLC (36). A control panel (48) is also preferably part of the pet toilet. The control panel (48) has a start switch (or flush button) (47) and other controls (49) to control the cleaning cycle.

Optionally, wet litter (33) is dried by the active and even introduction of airflow into the pet toilet. A fan (40) is preferably used to dry the litter (33). An air line (43) provides air to the fan (40) from the water inlet/outlet. A valve (42) on the fan (40) closes during cleaning so that water can not get into the fan (40). Fan air inlets (45), similar to a grill, allow air to enter the fan (40). A cover (not shown) is also optionally put over the working parts of the pet toilet (1). This optional accessory makes the pet toilet (1) more attractive.

A motor activated safety door (35) is also preferably included in the pet toilet. When the litter chamber (2) is in the down position, the safety door (35) is closed, preventing any pet or human contact with the blade (12). As the litter chamber (2) rotates to the vertical position, the safety door (35) rotates to bring itself in close association with the bottom of the litter chamber (2). This movement is accomplished with a small motor (41). The safety door (35) is not easily opened by tampering. The safety door (35) has a hinge point (51) around which it moves.

Referring also to FIGS. 6A through 6D and FIGS. 7A through 7C, a blade is located at the lowest point of the tapered end (16) of the litter chamber (2). This design allows maximum contact between the blade and the solid waste when the pet toilet (1) is in a vertical position. A blade motor (11) drives the blade's movement. A ring (14) surrounds the motor (11). The blade can be various shapes. For example, blade (12) has blade points (13) which help blade (12) process the solid waste. Blade (34) uses its spiral design (52) to process the waste. Blade (39) has wedge shaped blade tips (53) to help process the waste. Although the "blade" will be described as blade (12) herein, any of the blades described above, as well as any blade capable of efficiently processing the waste, could be substituted without deviating from the spirit of the invention. Holes (30) preferably surround blade (12), (34) or (39). These holes (30) are the entry and exit points for water during cutting and agitating. After some water comes in, the waste is floated off. Since the waste is lighter than the litter (33), it floats up. The waste gets caught at the sculptured end (23), where it is then directed out the exit pipe (19). Preferably, more clean water is added to backflush the litter (33). The rate of backflushing should be sufficient to loosen the litter (33), but not enough to float it off.

Figure 1:
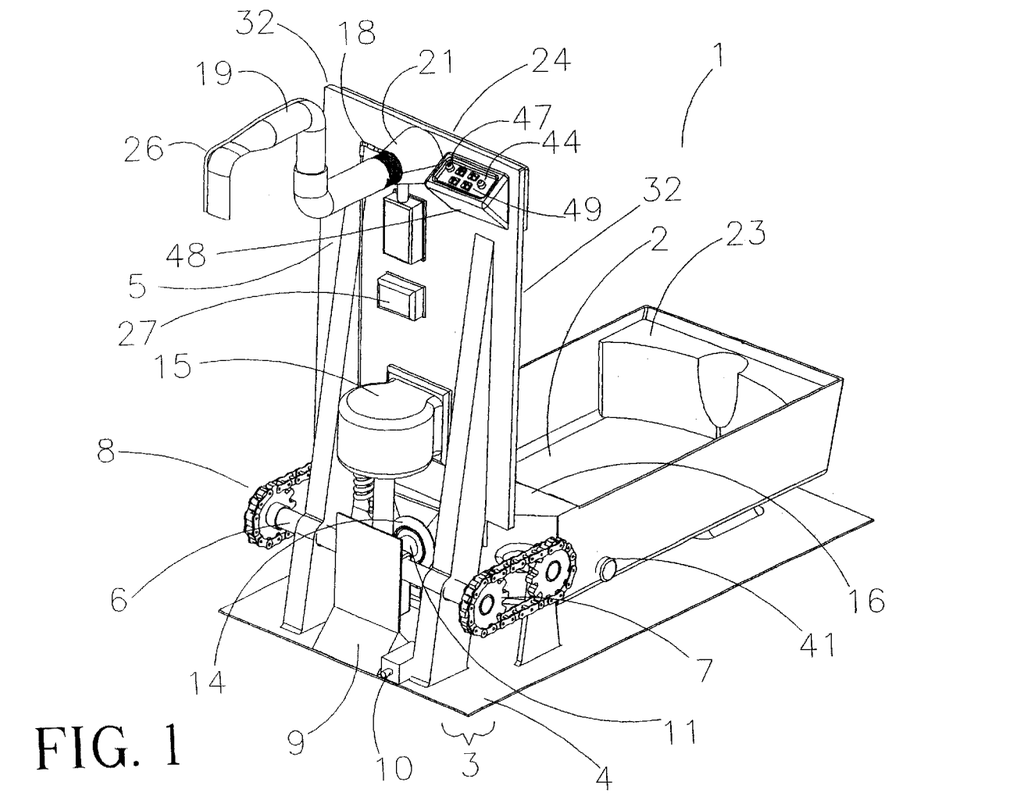
FIG. 1 shows an example of the pet toilet in an embodiment of the present invention.
Figure 2:
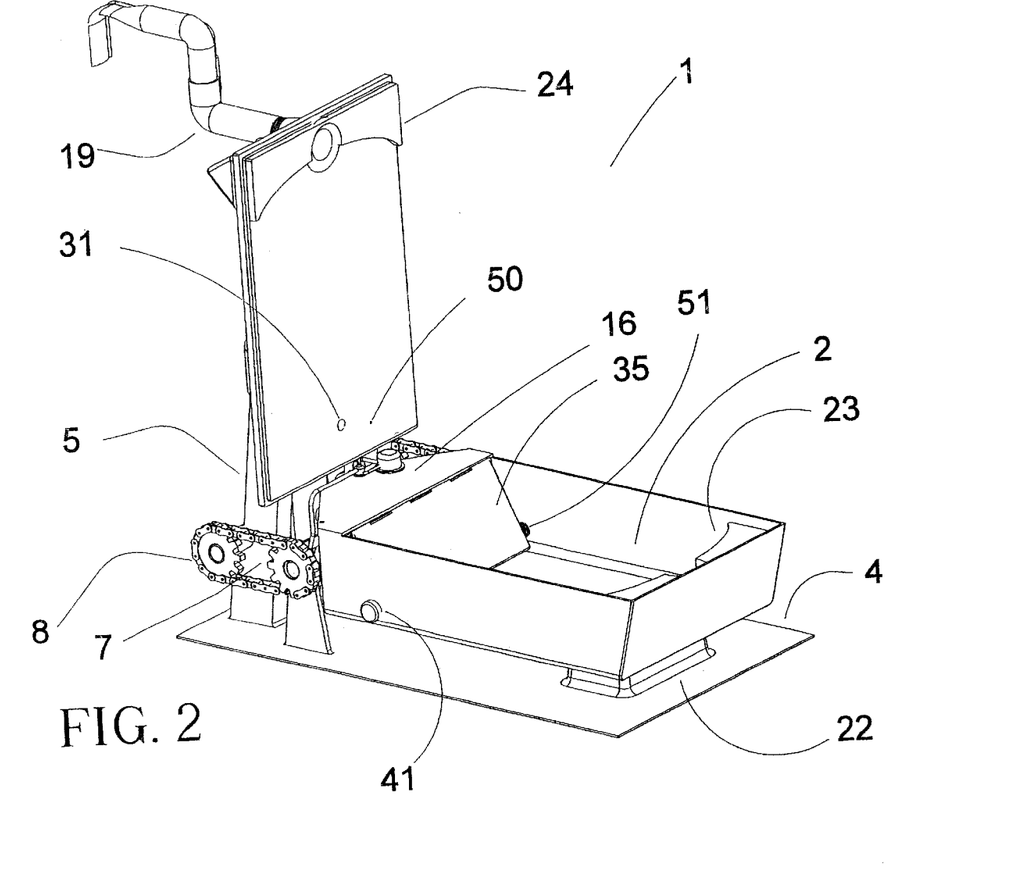
FIG. 2 shows an alternative view of the pet toilet shown in FIG. 1.
Figure 3:
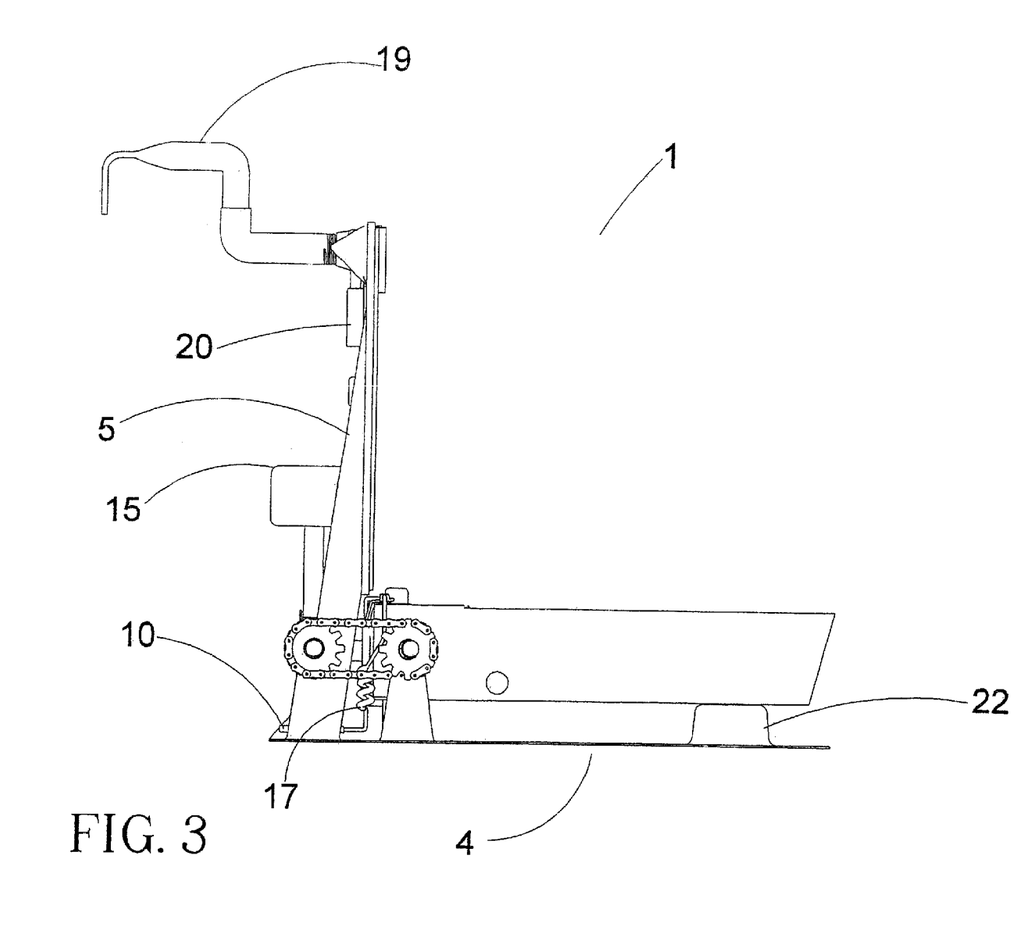
FIG. 3 shows a side view of the pet toilet shown in FIG. 1.
Figure 4:
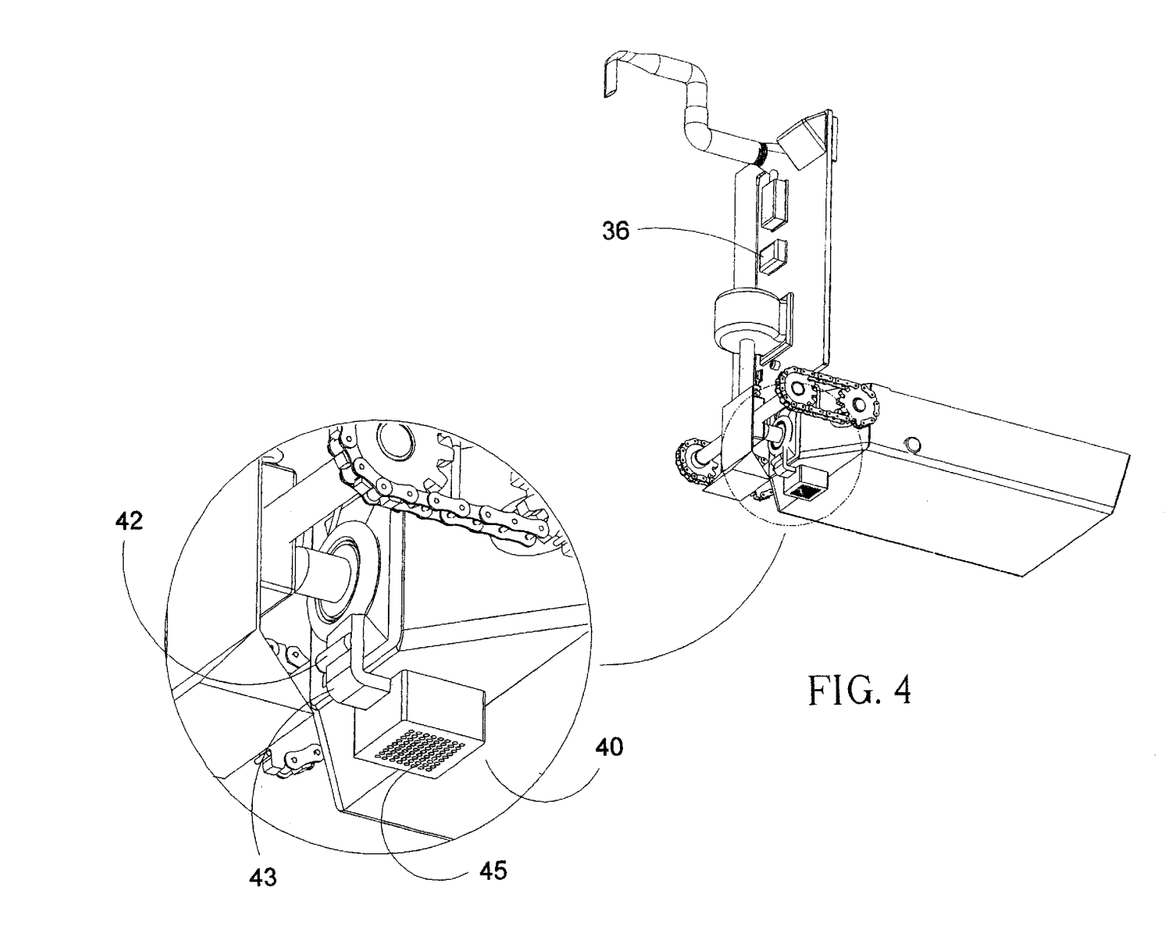
FIG. 4 shows a close-up view of the underside of the pet toilet in an embodiment of the invention.
Figure 5:
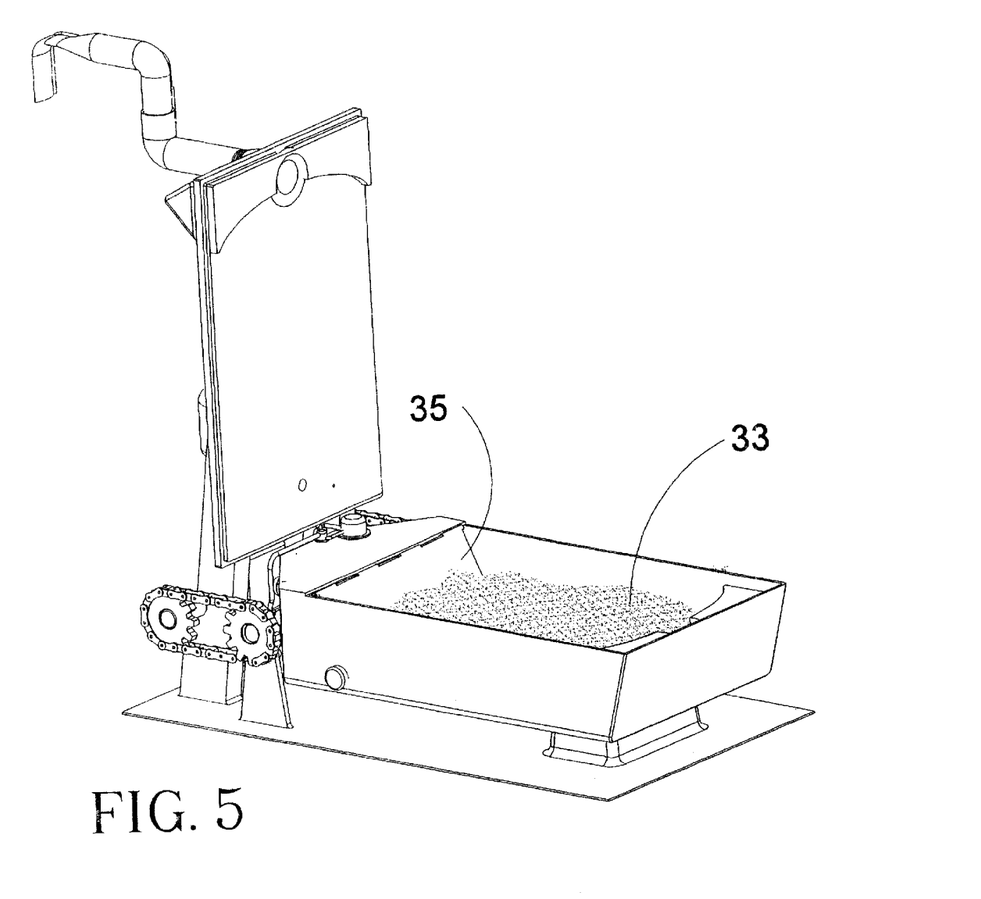
FIG. 5 shows the pet toilet containing litter.
Figures 6A, 6B:
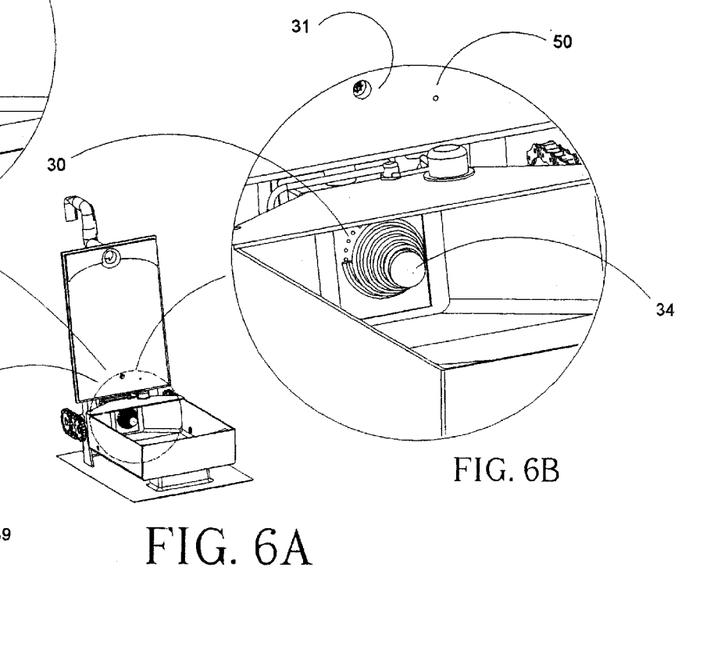
FIG. 6A shows the location of a blade in the pet toilet of the present invention.
FIG. 6B shows a blown-up view of the blade shown in FIG. 6A.
Figure 6C:
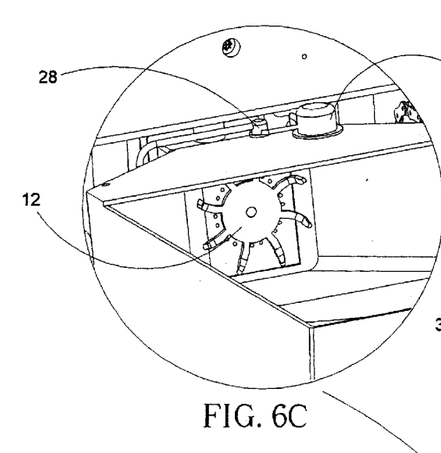
FIG. 6C shows a blown-up view of an alternative type of blade used in the pet toilet in an embodiment of the invention.
Figure 6D:
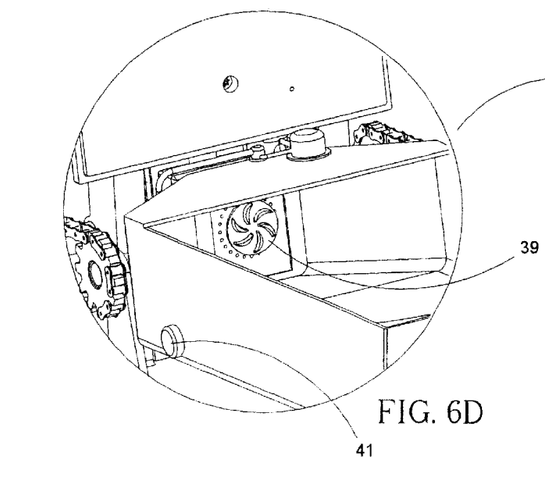
FIG. 6D shows a blown-up view of an alternative type of blade used in the pet toilet in an embodiment of the invention.
Figures 7A, 7C:
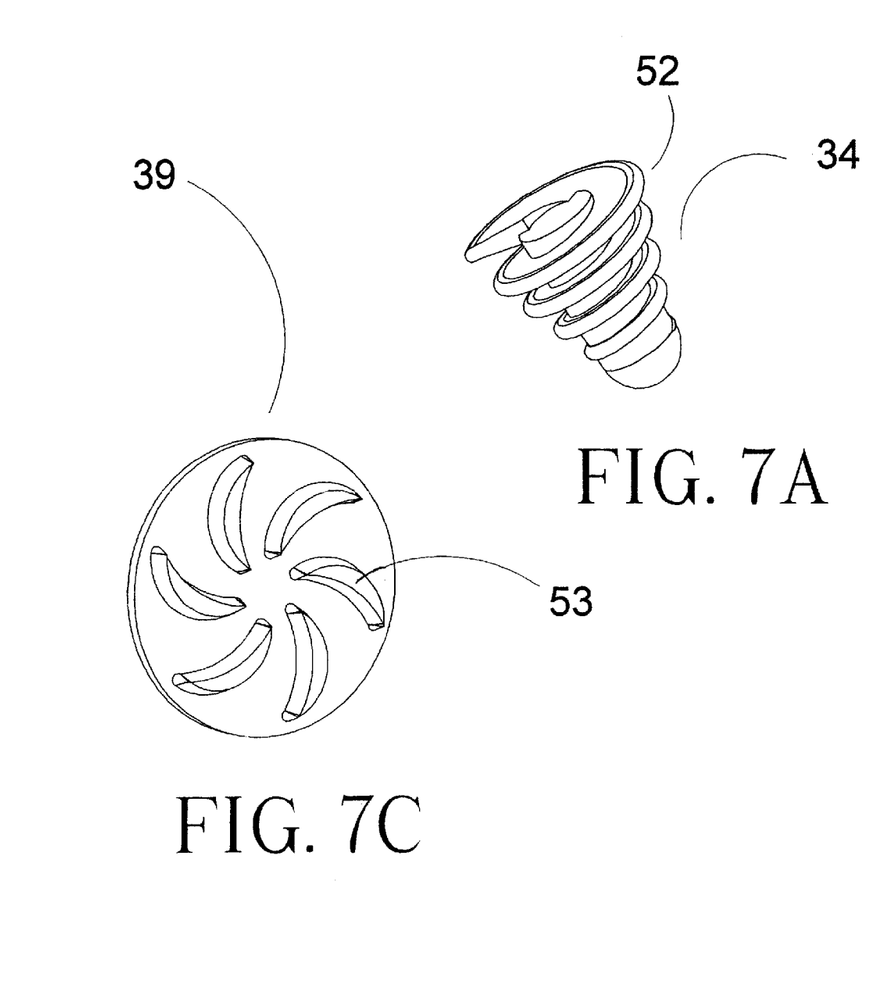
FIG. 7A shows a close-up view of the blade shown in FIGS. 6A and 6B.
FIG. 7C shows a close-up view of the blade shown in FIG. 6D.
Figure 7B:
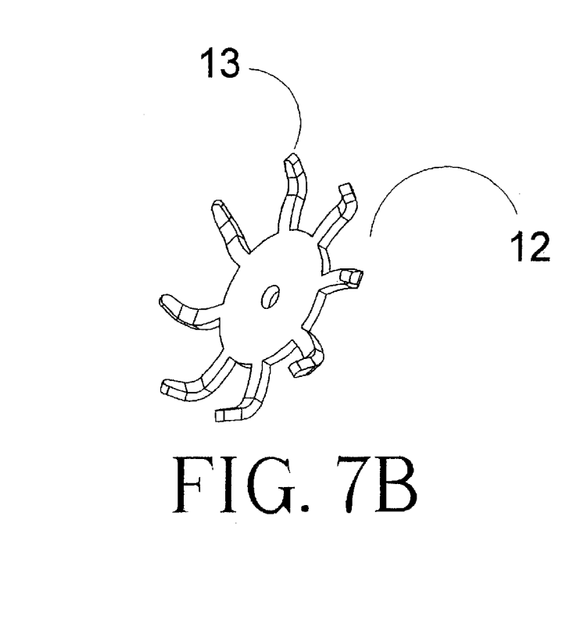
FIG. 7B shows a close-up view of the blade shown in FIG. 6C.
Figure 8:
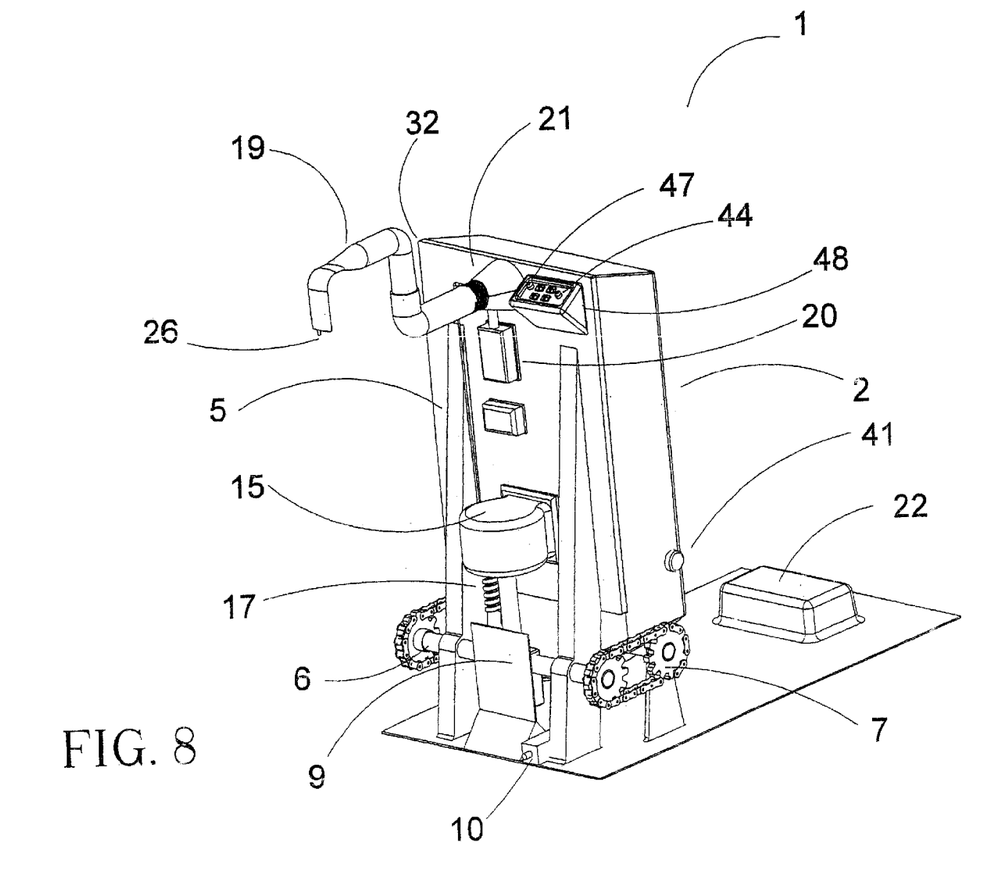
FIG. 8 shows the pet toilet when it is in the cleaning position.

Referring also to FIG. 8, the litter chamber (2) and lid (32) are now sealed in a vertical position. The sculptured end (23) is now located at the top of the litter chamber (2), while the tapered end (16) is located at the bottom of the litter chamber (2). The sculptured ends (23) and (24) have created an airtight seal, and the pet toilet (1) is now in a position for cleaning.

A connector (21) connects a hole in the sculptured ends (23) and (24) to the exit pipe (19). A motor (20) rotates ball valves, and closes for the pressure check prior to cleaning. When the valves close, it is necessary to determine that the litter chamber (2) is sealed. A compressor (27) fills the litter chamber with air. A compressor inlet (50) allows air to enter the litter chamber (2). In a preferred embodiment, approximately one to two pounds of air is used. A pressure test is then performed. A pressure sensor (31) determines whether the chamber (2) is sealed. A pump (25) preferably pumps the water out. A three-way valve (28) is attached to the pump (25). When the inlet is open, the three-way valve (28) allows water in. When the outlet is open, it allows water to exit.

There is also an attachment to the pump (25). When both the inlet and outlet are closed, the pressure test is performed.

The space inside the litter chamber (2) and lid (32) when they are closed only needs to be as large as required to fit the litter and the water. In this manner, minimal amounts of litter and water are necessary to clean the pet toilet (1). The lower end (16) is tapered so that the waste collects at the lowest point of the litter chamber (2). The sculptured ends (23) and (24) also allow for solid waste to be channeled into an exit pipe (19) during cleaning.

An inlet (10) is required to allow water to enter the pet toilet from a source, such as the hard plumbing in a house. It is also-necessary to drain the dirty water after use. The water draining plumbing includes helical hose (17), which connects to hose (18). The water then exits through hose (26). Although hose (17) is shown as a helical hose (17), any type of hose may be used for each of the hoses (17), (18), and (26). The hoses are preferably flexible.

There are various water routing lines, which can be used to hook up the pet toilet. This device can be hooked up to incoming water lines and directly to the waste line. It can also be hooked only into the incoming water line and placed slightly above and next to a toilet in such a way so it would drain into the toilet.

Figure 9:
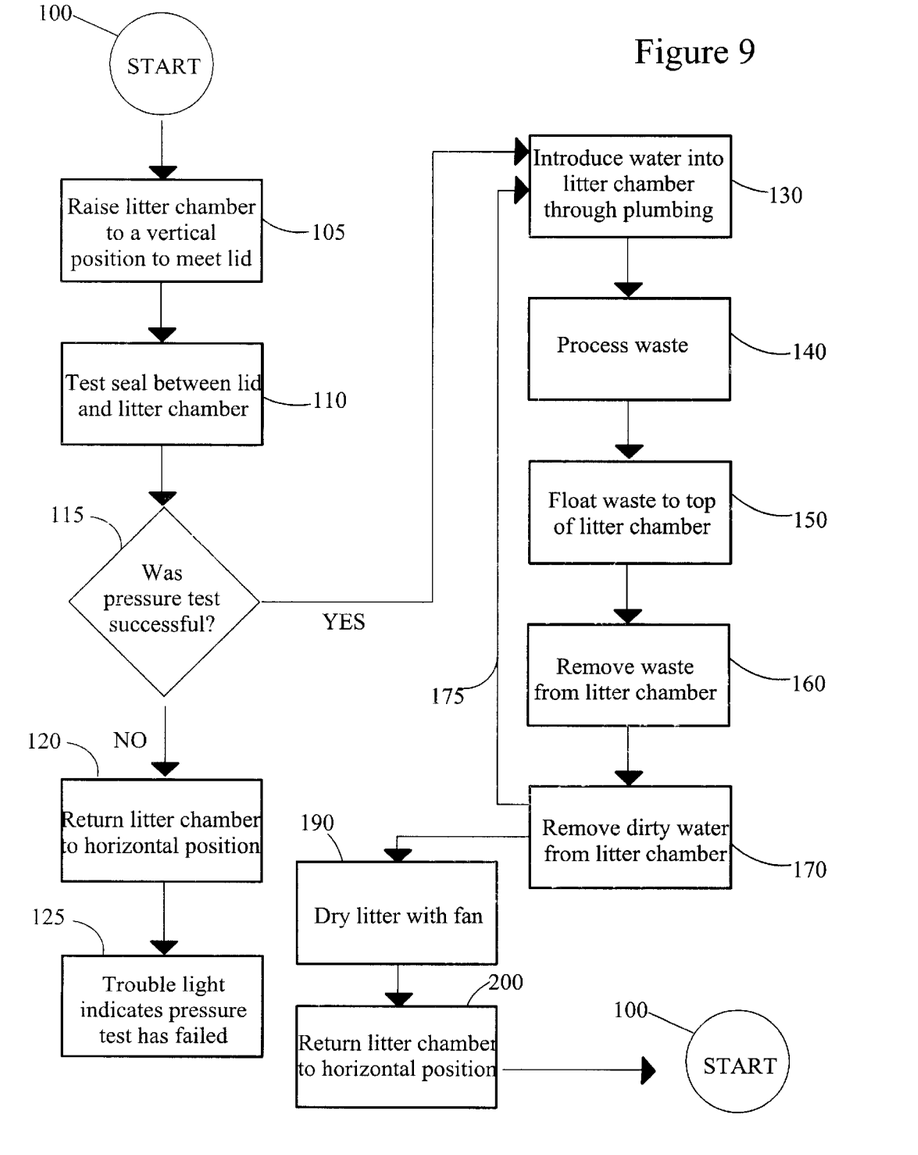
FIG. 9 shows a flowchart of a method of the present invention.

Referring to FIG. 9, an example of the method of operation of the automatic self-cleaning pet litter box follows.

Operation of the device starts in step (100). The flush cycle is preferably started by human activation. The pet toilet (1) is preferably attached to a timer, so that it initiates a cleaning cycle at a specified time each day, or as often as the pet owner desires. For example, one would choose a time when the pet is not likely to be using the pet toilet (1), such as the middle of the night. Alternatively, the cleaning cycle is manually initiated by pressing a start switch (47) to begin the cycle.

In step (105), the litter chamber (2) is rotated into a vertical position, to meet the lid (32). This is accomplished by a mechanism which preferably includes a transmission (9) and a motor (15), which drive the transaxle (6) and the pairs of gears (7) attached to both ends of the transaxle (6). A chain (8) preferably connects the gears in each pair (7). Gravity allows the litter (33) and the waste to fall to the bottom of the chamber (2). The litter (33) does not spill out due to a partial fixed cover at the tapering end (16) of the pet toilet (1). The lid (32) fits snugly on the litter chamber (2), thus creating a sealed chamber. If there is a pet in the pet toilet (1) when the litter chamber (2) tries to rotate in step (110), the pet's physical presence prevents the toilet (1) from closing. In this way, the pet acts as a delay, and is not harmed by the pet toilet (1), even if it begins to close while the pet is in it. Once the pet leaves the pet toilet (1), the litter chamber (2) can close and the cleaning process begins. The closing of the pet toilet (1) is the first action of the program that runs the cleaning process.

The closing of the pet toilet (1) signals to the program, through a switch (i.e. mechanical, hall, and tilt) that the cycle of cleaning should begin, and triggers the next step in the process. In step (110), the seal between the lid (32) and the litter chamber (2) is tested. This step is preferably accomplished using a compressor (27) and a pressure sensor (31). After the litter chamber (2) and the lid (32) close, the compressor (27) fills the chamber with air. In a preferred embodiment, approximately one to two pounds of air is used. During this test stage, all of the valves are closed.

The pet toilet (1) must then determine whether the pet toilet (1) is sealed in step (115). If the pressure test fails, the litter chamber (2) returns to its horizontal position in step (120). A trouble light (44) indicates that the pressure test has failed and that the seal should be checked in step (125).

If the pressure sensor (31) accepts the pressure as sealed, the system assumes the inlet valve (10) can be opened. This allows liquid, preferably in the form of water, to be introduced into the litter chamber (2) in step (130). The water is introduced through the inlet (10) line and the holes (30) surrounding the blade (12). The amount of water entering the litter chamber (2) can be controlled either through a timing function or through the use of a float switch. Water usage is minimized by using only enough water to cover the litter (33). An amount of water sufficient enough to loosen the litter (33), but not to float it off, is added.

In step (140), the waste is processed by a blade (12). The blade (12) is found at the lowest point of the litter chamber (2) when the litter chamber (2) is in the vertical position. This design allows maximal contact between the blade and the waste. A motor (11) drives the blade (12). The blade points (13) cut and agitate the waste.

In step (150), the waste floats to the top of the litter chamber (2). Optionally, one could add some more water after agitation by the blade, in order to float off the waste more effectively. Alternatively, or in addition, the blade (12) may continue to agitate during this step, preferably at a slower speed than in step (140). The waste is caught at a high point created by the sculptured ends (23) and (24) of the litter chamber (2) and lid (32), respectively.

Once the waste is floated off, it is removed from the litter chamber (2) through the exit pipe (19) in step (160). The exit pipe (19) is preferably hard-plumbed to a household line, similar to a water filter. Alternatively, the exit pipe (19) delivers the waste into a toilet for disposal.

In step (170), the dirty water is removed from the litter chamber (2). Various hoses (17), (18) and (26) act to drain the water from the litter chamber (2).

Steps (130) through (170) are optionally repeated in step (175), to further clean the litter (33).

As an optional step (190) in the cleaning cycle, air is blown into the litter chamber to dry the litter (33). This step can be performed any time after the water is removed from the litter chamber (2). This step is preferably accomplished using a fan.

The litter chamber (2) is returned to its horizontal position in step (200). The litter chamber (2) is now available again for use by the pet.

In a preferred embodiment, all of the steps described above are manually initiated by a pet owner. For example, a pet owner manually closes the pet toilet (1) in step (105). Then, she turns or presses a start switch (47), a valve or a knob to start the cleaning process. This would initiate steps (110) and (115) to test the seal between the lid (32) and the litter chamber (2). If the pressure sensor (31) accepts the pressure as sealed, water is introduced into the litter chamber (2) in step (130). At that point, the pet owner presses another button, or the same button or lever again to turn the blade (12) on, allowing the blade (12) to process the waste instep (140). For example, the start switch (47) is turned a quarter turn (or some portion of a turn) to initiate each subsequent step in the process. Then, the switch (47) is turned again to fill the litter chamber more completely and float off the waste in step (150). In a preferred embodiment, there is a window through which the pet owner could see when all of the waste was completely floated off. The pet owner turns the switch (47) to remove the waste from the litter chamber (2) through the exit pipe (19) in step (160). Once the waste is removed, the pet owner turns the switch (47) again to pump the water out through the exit pipe (19) in step (170). When all of the dirty water has been pumped out of the litter chamber (2), the pet owner manually returns the litter box to its horizontal position in step (200).

In an alternative embodiment, operation of the pet toilet (1) is water-powered. For example, the plumbing supplying the water to the pet toilet (1) has a very small drip (e.g. about one cup of water accumulating in twenty-four hours) which accumulates water in a separate receptacle. Once the amount of water in this receptacle reaches a certain level, the cleaning cycle is initiated.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A pet toilet for receiving and disposing of animal waste comprising:
    a) a litter chamber comprising a first sculptured end and a second tapered end, wherein the first sculptured end is at a top of the litter chamber and the second tapered end is at a bottom of the litter chamber when the litter chamber is in a vertical position;
    b) a lid in a vertical position, wherein the lid fits on the litter chamber, wherein the lid and the litter chamber create an airtight seal when the litter chamber is in the vertical position;
    c) a blade, wherein the blade is located at a lowest point of the tapered end of the litter chamber such that waste directed to the lowest point when the litter chamber is in the vertical position is processed by the blade;
    d) a plurality of hoses, wherein the hoses supply and drain water to and from the litter chamber when the litter chamber is in the vertical position; and
    e) an exit pipe located at a sculptured portion of the first sculptured end such that, when waste floats up to the top of the litter chamber, the first sculptured end directs the waste out of the pet toilet through the exit pipe; wherein the litter chamber is in the vertical position during cleaning.

2. The pet toilet of claim 1, further comprising:
    f) a mechanism for moving the litter chamber between the vertical position and a horizontal position.

3. The pet toilet of claim 2, wherein the mechanism includes:
    a) a transmission;
    b) a motor;
    c) a transaxle run by the transmission and the motor; and
    d) a pair of gears attached to each end of the transaxle.

4. The pet toilet of claim 1, further comprising a motor for running the blade.

5. The pet toilet of claim 1, further comprising a plurality of holes around the blade such that the holes allow an entry and an exit of water into and out of the litter chamber.

6. The pet toilet of claim 1, wherein the exit pipe is hard-plumbed to a household waste water line.

7. The pet toilet of claim 1, further comprising an L-shaped support including:
    a) a base, wherein the litter chamber runs substantially parallel to the base when the litter chamber is in a horizontal position; and
    b) two extensions running perpendicular to the base, wherein the extensions are attached to the lid.

8. The pet toilet of claim 1, further comprising a pressure sensor, wherein the pressure sensor accepts a pressure as sealed when the litter chamber and the lid are joined.

9. The pet toilet of claim 1, further comprising a compressor, wherein the compressor pressurizes the litter chamber when the litter chamber and the lid are joined.

10. The pet toilet of claim 1, wherein the exit pipe leads to a household toilet.

11. The pet toilet of claim 1, further comprising a timer attached to the pet toilet, wherein the timer is set to clean the pet toilet at specified intervals.

12. The pet toilet of claim 1, further comprising a stand attached to the base, wherein the stand allows the litter chamber to be level when in use by a pet.

13. The pet toilet of claim 1, further comprising at least one fan, wherein the fan dries the litter chamber after cleaning.

14. The pet toilet of claim 1, wherein the pet toilet is at least partially filled with particulate material selected from the group consisting of:

a) sand;

b) glass beads;

c) elastic beads; and d) plastic.

15. The pet toilet of claim 1, further comprising a flush button to activate a cleaning cycle of the pet toilet.

16. The pet toilet of claim 15, wherein the flush button has a plurality of positions which initiate a plurality of steps in the cleaning cycle of the pet toilet.

17. The pet toilet of claim 1, further comprising a computerized control, wherein the computerized control controls a cleaning cycle through a plurality of timing functions.

18. The pet toilet of claim 17, wherein the computerized control is a programmable logic controller.

\* \* \* \* \*